W. SELLERS.
INJECTORS FOR FEEDING-BOILERS.
No. 7,816. Reissued July 24. 1877.
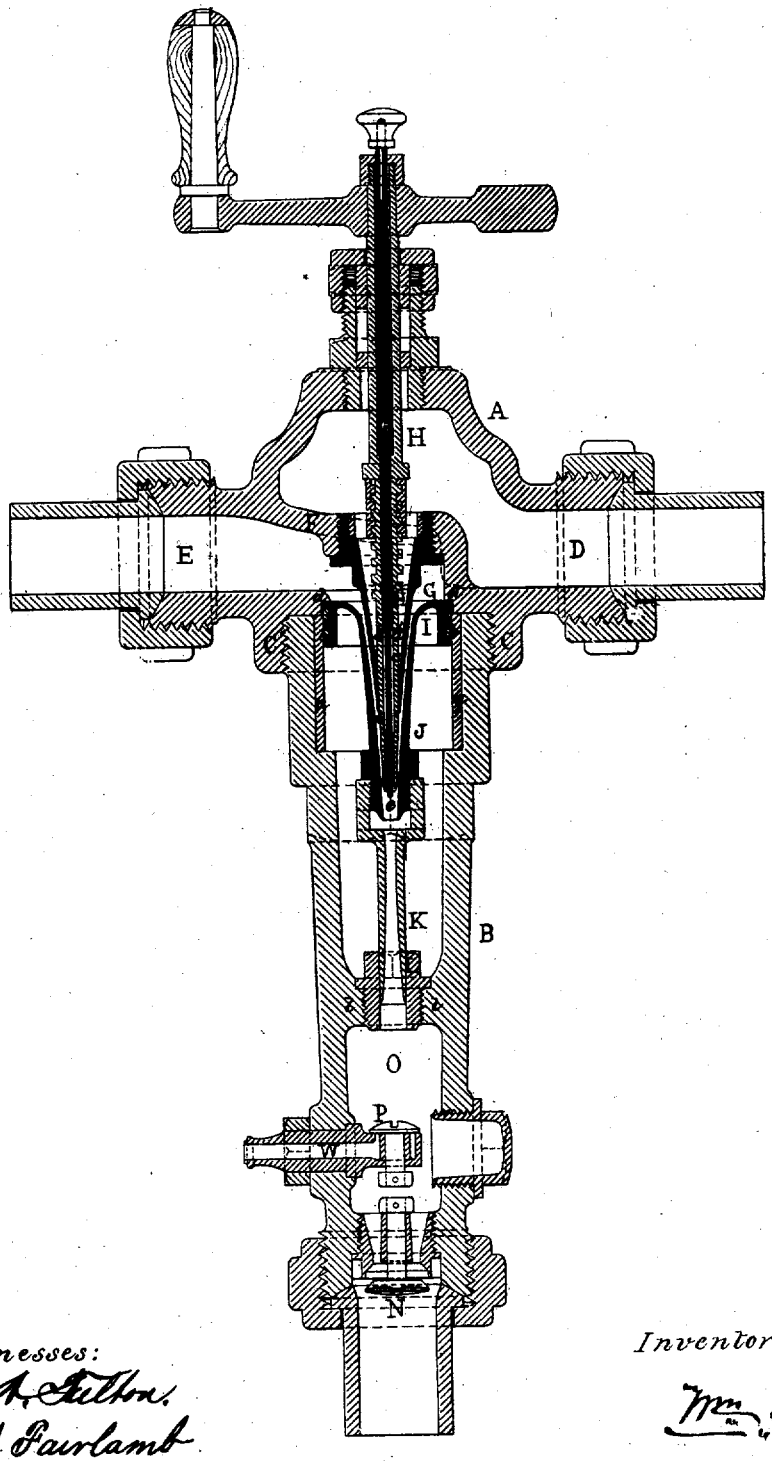
*Witnesses:*
H. A. Fulton.
Geo. A. Fairlamb.
*Inventor*
Wm. Sellers
THE NORRIS PETERS CO., PHOTO-LITHO., WASHINGTON, D. C.

UNITED STATES PATENT OFFICE.

WILLIAM SELLERS, OF PHILADELPHIA, PENNSYLVANIA.

IMPROVEMENT IN INJECTORS FOR FEEDING BOILERS.

Specification forming part of Letters Patent No. 75,059, dated March 3, 1868; Reissue No. 7,816, dated July 24, 1877; application filed February 20, 1877.

*To all whom it may concern:*

Be it known that I, WILLIAM SELLERS, of the city of Philadelphia and State of Pennsylvania, have invented new and useful Improvements in the Giffard Injector, whereby this instrument is rendered more efficient, and is simplified in construction; and I do hereby declare that the following is a full and exact description thereof, reference being had to the accompanying drawing, and to the letters of reference marked thereon.

One portion of these improvements is applicable only to the self-adjusting injector patented by me August 15, 1865; but, as all are applicable to this form, the drawing represents this construction.

In the instrument described in my said former patent, it will be observed that the fluid jet is discharged laterally from the pipe J and J′, in which it is formed, so as to permit an arrangement which will prevent the boiler-pressure from producing any movement of this pipe.

To accomplish this object the pipe J and J′ is extended beyond the point of discharge, so as to pass through another stuffing-box of the same size as the one above the point of discharge, thereby preventing any pressure in the direction of the axis of the pipe J J′.

The objects of my present improvements are, first, to enable all injectors constructed for feeding steam-boilers to throw a smaller quantity of water than has heretofore been possible, and to accomplish this without in any way affecting their maximum capacity; second, to enable the instrument to draw its supply-water from a lower level without increasing the number of its parts; third, to simplify the construction of the self-adjusting injector; fourth, to enable the self-adjusting injector to lift its supply-water.

The nature of my invention consists in the arrangement of the steam-discharge nozzles of all injectors constructed for feeding steam-boilers, so that the steam may be confined to a central discharge of less diameter than the smallest diameter in the discharging-tube, while I retain the capacity of the nozzle to discharge a central jet of greater diameter; and it also consists in the construction of the discharging tube or pipe which delivers the water from the self-adjusting injector to the boiler, so that the boiler-pressure can exert but a very slight influence upon the end exposed to it, the internal construction of this pipe conforming as near as possible to that which the jet would assume when forced into a fluid at rest, in which case no lateral strain would be exerted upon the pipe, and the only pressure that could produce a longitudinal movement would be that exerted upon the edge, where the parellel outside meets the divergent inside; and it also consists in the means for limiting the movement of the self-adjusting piston so as to obtain an effective vacuum, all of which is more fully explained by referring to the drawing herewith.

The outer shell or case of the injector I make in two parts, A and B, united by a screw-thread, C. The part A is provided with two nozzles, D, for the admission of steam, and E for the admission of the water, the two being separated by the plate F. In the center of the plate F I provide a nozzle, G, for the steam-jet, the amount of steam discharged from the nozzle being regulated by the tapered plug H, which may be operated by a screw-lever or other convenient device. The interior of the case B, from the end where it is joined to the part A, is bored out for a short distance and fitted with a cylindrical brass lining, *a a*, which is turned out to receive the packing *b b* in the piston I, and this piston must play freely longitudinally therein. This piston forms the upper or receiving end of the converging pipe J, which I denominate the combining-tube, and this tube is united at its smaller end with the divergent tube K, which I call the discharging-tube, the axis of both tubes being in the same line and in the line of the axis of the steam-nozzle G. The exterior of the discharging-tube K is cylindrical, and supported in the brass bushing L, which is screwed into the plate *l l*, cast with the outer shell or case B. This bushing must be of sufficient length to prevent the escape of water in any important quantity, when the discharging-tube K is fitted so as to play freely through it. The combining and discharging tubes J and K must have sufficient movement longitudinally to admit the maximum amount of water required between the exterior of the steam-nozzle G and the interior of the combining-tube, and to enable the instrument to lift water from a lower level there must be a stop provided, which will prevent the combining-tube from moving so far toward the nozzle G as to close the opening for water entirely. In this case the piston I will strike a small flange, *d d*, in the upper case, before the surfaces referred to can come in contact.

It is well known that the nozzles in the Giffard injector, although well arranged for forcing water, are not so well adapted to produce a vacuum for the purpose of lifting the supply to the instrument.

To force water by means of an injector into a boiler under steam-pressure, and to obtain the requisite power from the steam within the boiler to force the water in a single jet, it is necessary that the discharging-orifice for the steam-jet should be larger than the smallest diameter of the discharging-tube through which the combined jet of steam and water enters the boiler, and to give any range of adjustment it is necessary that this orifice should be very considerably larger, in practice their respective areas being about as two and a half is to one. To lift water, on the contrary, it is requisite that the cross-section area of the steam-jet should be less than the smallest cross-section area of the discharging-tube, and in all single-jet injectors previous to my invention this could only be effected by projecting the regulating-spindle or plug into the steam-nozzle, so as to convert the central steam-jet into an annular one of extremely small cross-section. In so doing the interior of the steam-nozzle and the circumference of the plug must be so nearly in contact that the velocity of the issuing annular steam-jet is seriously diminished by the friction, and still further diminished by the fact that its diameter is so great that it strikes against the converging sides of the combining-tube, so that its efficiency for drawing along with it the air in the pipes is correspondingly impaired.

The same quantity of steam issuing from a central orifice as a cylinder would have a much higher initial velocity, and, being discharged at and in line with the axis of the combining-tube, would maintain that velocity with less resistance from the tube, and its capacity for carrying along with it a quantity of air would be correspondingly increased.

To improve the instrument by enabling the jets to be adapted to each other, so as to fulfill the best conditions for raising the water, while I retain the capacity unimpaired for forcing, I make the plug H much longer than is customary with the ordinary injector, and drill a hole, *c c*, from its small end far enough to communicate, by a cross-hole, *d′ d′*, with the steam-space in the nozzle G, after the plug H has closed the tapered end of the nozzle G. The size of this hole should be about one-half that of the smallest diameter of the discharging-tube, when designed to lift only.

To obtain the smallest possible minimum delivery of water, the steam-discharge nozzle G and the hollow plug H must act in conjunction, and the hole in this plug must be made larger than when arranged for lifting only. At the maximum delivery the plug is withdrawn into the nozzle G, so that the flow of steam is limited by the size of the orifice in this nozzle. As the plug is protruded through this orifice the steam-discharge is lessened, and the flow of water is diminished, and the minimum delivery is reached when the volumes of steam from the nozzle and from the end of the plug are about equal. To effect this result, however, the size of the hole in the plug H must be so much enlarged as to destroy, or seriously impair, the lifting capacity of the instrument, and to restore this as far as practicable, a movable rod, *e e*, must, in such cases, be provided to diminish the quantity of steam when it is desired to raise the supply-water.

When this rod *e e* is used, the reduced jet will, of course, be annular, but its total diameter being much less than the diameter of the end of the steam-nozzle G, will be more effective for lifting than the annular jet would be from the steam-nozzle regulated by a solid plug; but an enlarged lifting capacity being of more consequence than the least possible delivery of water, I attain the former by making the hole in the plug H about half the diameter of the smallest diameter in the discharging-tube, in which case the rod *e e* is dispensed with.

It is evident this improvement is applicable to all injectors constructed for feeding boilers in which the steam-jet is regulated in the steam-nozzle.

To make the waste-orifice self-closing, the opening W must be of such a size that the water which can be discharged by the injector when in full action will not pass through it without creating a pressure in the chamber O greater than that in the boiler to which the injector supplies the water. The inner end of this orifice is closed by a check-valve, P, arranged with reference to the main valve N, so that when the main valve N is closed the waste-valve P must be open.

In starting the injector, the water will be discharged through the valve P and opening W until the quantity is increased so as to produce a pressure in the chamber O greater than that in the boiler. This will open the main check and permit the valve P to close, shutting off the waste, and compelling all the water to pass into the boilers.

In Giffard's English patent of 1858, No. 1,665, a hollow plug, in combination with a steam-discharge nozzle, is shown in the drawings, and referred to in the specification. The object of the arrangement is not stated, but it would seem to be a modification of his divided jet described in the same patent for working water too hot for the single jet. The central discharge is shown to be larger than the discharging-tube, and there are no means indicated whereby it can be diminished, so that this instrument would not be capable of operating so as to lift and force the water in the improved manner hereinbefore described.

Having thus fully described my invention, what I claim as new, and desire to secure by Letters Patent, is—

1. The combination, with the steam-nozzle, the combining-tube, and the discharging-tube, of a plug having a central discharge of less diameter than the smallest diameter in the discharging-tube, whereby the steam-discharge may be regulated, and also reduced from a solid jet of a diameter greater than the smallest diameter in the discharging-tube to a solid jet of less diameter than the smallest diameter in the discharging-tube, substantially as and for the purposes set forth.

2. The combination, with the steam-nozzle, of the plug H and rod *e e*, substantially as and for the purposes set forth.

3. The combination, with the piston I and case A, of the flange *d d*, substantially as and for the purposes set forth.

4. The combination, with the case B, of the bushing L, self-adjusting combining-tube J, and discharging-tube K, substantially as described.

WM. SELLERS.

Witnesses:
H. A. FULTON,
GEO. A. FAIRLAMB.